United States Patent  
Kanamori (10) Patent No.: US 9,032,195 B2
(45) Date of Patent: May 12, 2015

(54) NAVIGATION DEVICE FOR VEHICLE (75) Inventor: Motoki Kanamori, Takahama (JP)

(73) Assignee: DENSO CORPORATION, Kariya (JP)

( * ) Notice: Subject to any disclaimer, the term of this patent is extended or adjusted under 35 U.S.C. 154(b) by 1064 days.

(21) Appl. No.: 13/085,544

(22) Filed: Apr. 13, 2011

(65) Prior Publication Data

US 2011/0258427 A1 Oct. 20, 2011

(30) Foreign Application Priority Data

Apr. 15, 2010 (JP) .................................. 2010-93945

(51) Int. Cl.
G06F 9/24 (2006.01)
G06F 15/177 (2006.01)
G01C 21/26 (2006.01)

(52) U.S. Cl.
CPC ..................................... G01C 21/26 (2013.01)

(58) Field of Classification Search
CPC .................. G06F 11/1417; G06F 2212/1036; G11C 7/20
USPC ........ 713/1, 2, 300; 711/103; 365/228; 714/2
See application file for complete search history.

(56) References Cited

U.S. PATENT DOCUMENTS

| | | | |
|---|---|---|---|
| 6,067,398 A | 5/2000 | Sato | |
| 6,845,438 B1 | 1/2005 | Tanaka | |
| 2007/0006013 A1* | 1/2007 | Moshayedi et al. | 714/2 |
| 2007/0283428 A1 | 12/2007 | Ma et al. | |
| 2007/0300037 A1* | 12/2007 | Rogers et al. | 711/202 |
| 2009/0109786 A1* | 4/2009 | Ye et al. | 365/228 |
| 2009/0287874 A1* | 11/2009 | Rogers et al. | 711/103 |
| 2010/0169558 A1* | 7/2010 | Honda et al. | 711/103 |
| 2010/0235568 A1* | 9/2010 | Inamura | 711/103 |
| 2011/0022859 A1* | 1/2011 | More et al. | 713/300 |

FOREIGN PATENT DOCUMENTS

| | | |
|---|---|---|
| CN | 101520735 A | 9/2009 |
| JP | A-11-53271 | 2/1999 |
| JP | 2004-118336 A | 4/2004 |
| JP | A-2009-98726 | 5/2009 |
| JP | A-2009-282566 | 12/2009 |

OTHER PUBLICATIONS

Office Action mailed May 8, 2012 issued in corresponding JP patent application No. 2010-093945 (English translation attached).
Office Action dated Oct. 21, 2013 in the corresponding TW application No. 100112965 (English translation).
Office Action dated Oct. 22, 2013 in the corresponding CN application No. 201110090994.7 (English translation).
Office Action dated Mar. 27, 2014 in the corresponding CN application No. 201110090994.7 (with English translation).
Office Action dated Apr. 1, 2013 in corresponding CN patent application No. 201110090994.7 (and English translation).

* cited by examiner

Primary Examiner — Paul Yanchus, III
Assistant Examiner — Brandon Kinsey
(74) Attorney, Agent, or Firm — Posz Law Group, PLC (57) ABSTRACT A navigation device for a vehicle includes: a memory device including a NAND type flash memory for storing a predetermined program and a boot program and a controller for searching a failure block in the flash memory and managing a corresponding relation between a logic block and a physical block with eliminating failure blocks; a back-up power source; a power source switch for coupling the memory device with the back-up power source; a power source for generating a predetermined voltage with using the back-up power source; a control device energized from the power source with the predetermined voltage so as to be activated; and a power source control device. The control device determines whether activation is performed for the first time. The control device executes a stand-by process, and then, executes a boot process when the activation is performed for the first time. The control device executes the boot process without executing the stand-by process when the activation is after the first time. The power source control device controls the power source to function when the power source control device receives an activation signal from the power source switch. When the power source switch stops the activation signal, the power source control device stops the operation state of the power source.

7 Claims, 7 Drawing Sheets

NAVIGATION DEVICE FOR VEHICLE

CROSS REFERENCE TO RELATED APPLICATION

This application is based on Japanese Patent Application No. 2010-93945 filed on Apr. 15, 2010, the disclosure of which is incorporated herein by reference.

TECHNICAL FIELD

The present invention relates to a navigation device for a vehicle having a flash memory as a memory for a boot device storing a boot program.

BACKGROUND

In a navigation device for a vehicle, it is generalized such that a flash memory is used for a memory (refer to patent document No. 1). This flash memory includes a flash memory for a boot device that stores an IPL (i.e., Initial Program Loader), a OS (i.e., Operating System) and an application program, and a flash memory for a map media. Since the flash memory for the boot device is a NOR type flash memory, the dimensions of the memory are large, and a cost of the memory is high. On the other hand, a NAND type flash memory used for the flash memory for the map media has small dimensions of the memory, and the capacity of the memory increases with low cost. Thus, when the NAND type flash memory is used for the boot device, the cost can be reduced.

[Patent document No. 1] JP-A-H09-182010

However, the NAND type flash memory includes an inherent failure block in memory blocks of the flash memory. Further, when the flash memory is operated, a failure block is generated. Thus, a memory card controller controls not to use the failure block. Further, since the NAND type flash memory has a limitation of the number of rewriting times, the memory card controller controls the number of rewriting times.

In the NAND type flash memory such as a SD card, in order to control the above described failure block and the number of rewriting times, the memory card controller executes various processes such as a search process of all flash memories and a process for searching a convert table stored in the flash memory when a power source turns on (i.e., when an accessory switch turns on). Thus, an initial setting process time is long, for example, 1 seconds at a maximum, which is an actual measurement result. Accordingly, when the SD card is used for the boot device, for example, the CPU cannot access the flash memory while the memory card controller executes the initial setting process. Accordingly, the reading step of the CPU for reading the IPL from the flash memory at the beginning is delayed. Thus, activation of a soft ware such as the OS is delayed, and therefore, a response to communication with an in-vehicle LAN may not be ready in time.

SUMMARY

In view of the above-described problem, it is an object of the present invention to provide a navigation device for a vehicle. Although a NAND type flash memory is used for a boot device, activation of a soft ware is ready in time.

According to an aspect of the present disclosure, a navigation device for a vehicle includes: a memory device including a NAND type flash memory and a controller, wherein the NAND type flash memory stores a boot program and a predetermined program, which is read out by executing the boot program, the controller searches all failure blocks in the NAND type flash memory when the memory device is energized, and the controller manages a corresponding relation between a logic block and a physical block with eliminating searched failure blocks; a back-up power source for setting down a voltage of a battery mounted on the vehicle to a predetermined voltage; a power source switch for coupling the memory device with the back-up power source in an operation state; a power source for generating another predetermined voltage with using the back-up power source in the operation state; a control device energized from the power source with the another predetermined voltage so as to be activated, wherein the control device determines whether activation is performed for the first time under a condition that the memory device is connected to the back-up power source when the control device is activated, the control device executes a stand-by process for standing by until an initial setting process of the memory device is completed when the control device determines that the activation is performed for the first time, and then, the control device executes a boot process for reading a boot program from the memory device, and the control device executes the boot process without performing the stand-by process when the control device determines that the activation is after the first time; and a power source control device. The power source control device controls the power source switch to turn on when the navigation device is coupled with the back-up power source. The power source switch transmits an activation signal for activating the control device, according to an activation operation of a user. The power source control device controls the power source to function when the power source control device receives the activation signal from the power source switch. The power source switch stops transmitting the activation signal when the user releases the activation operation. The power source control device stops the operation state of the power source when the power source switch stops the activation signal.

In the above device, when the power source control device receives the activation signal for activating the control device, the power source control device controls the power source switch to couple the memory device including the NAND type flash memory with the back-up power source. Further, the power source control device controls the power source to energize the control device. Thus, the control device is activated, and the control device determines whether activation is performed for the first time under a condition that the memory device is coupled with the back-up power source. When an operator executes an activation operation (i.e., an accessory-on operation) at a manufacturing time of the vehicle, the activation is performed for the first time. The memory device connected to the back-up power source executes the initial setting process for searching a failure block and generating a convert table between the logic block and the physical block.

After the vehicle is delivered to the use when the activation signal is input into the power source control device according to the activation operation (i.e., the accessory-on operation) of the user, the power source control device controls the power source to energize the control device so that the control device is activated. In this case, since the activation operation is performed after the first time under a condition that the memory device is coupled with the back-up power source, the initial setting process in the memory device, which requires much time, is not executed. Thus, the control device executes the boot process for reading the boot program from the memory device. When the boot program is executed, for example, the device can respond to an instruction from an outside.

When the user releases the activation operation (i.e., an accessory-off operation), the activation signal stops. Thus, the power source control device stops energizing from the power source to the control device. In this case, the power source control device maintains the operation state of the power source switch, and therefore, the condition is maintained such that the memory device is coupled with the back-up power source.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

An example embodiment of the present invention will be explained with reference to drawings.

Figure 1:
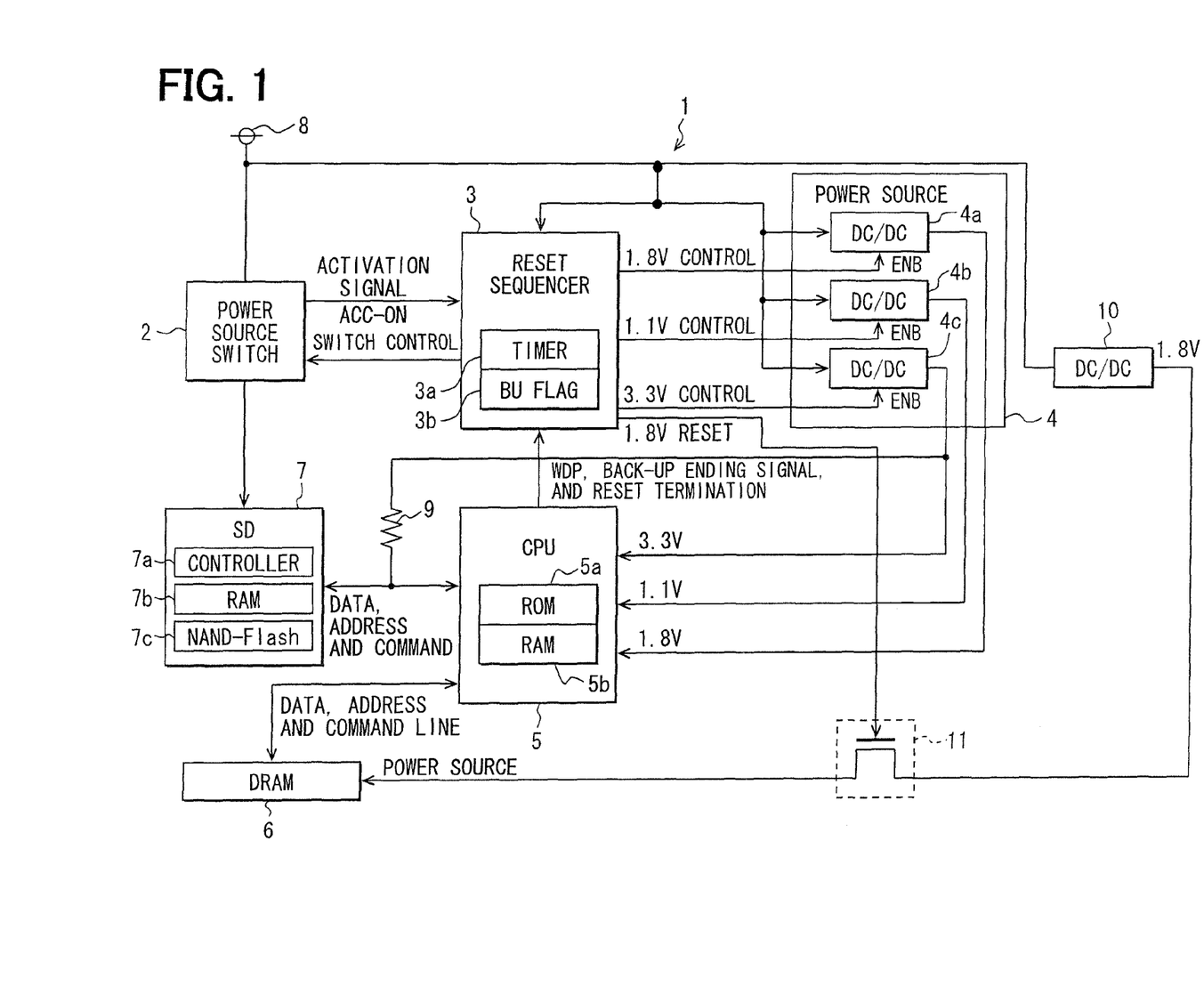
FIG. 1 is a diagram showing schematically a whole construction according to an example embodiment.

FIG. 1 schematically shows a whole construction of a navigation device for a vehicle. The navigation device 1 for a vehicle (i.e., "a vehicle navigation device") includes a power source switch 2, a reset sequencer 3 (corresponding to a power source control means), a power source 4, a CPU 5 (corresponding to a control means), a DRAM 6 (corresponding to a memory means for back-up), and a SD card 7 (corresponding to a memory means). The vehicle navigation device 1 functions according to energization from a back-up power source 8 (i.e., "BU power source"). The BU power source 8 is a power source, which continues to energize even when an ignition switch of the vehicle turns off, and a main power source turns off. The BU power source 8 is operated by setting down a battery voltage (e.g., 12 volts) to be 3.3 volts. The BU power source 8 is coupled with the power source switch 2, the reset sequencer 3 and the power source 4. Accordingly, under a condition that the vehicle navigation device 1 is coupled with the BU power source 8, the energization is performed from the BU power source 8 to the power source 4 via the power source switch 2 and the reset sequencer 3.

The SD card 7 is coupled with the power source switch 2. Under a condition that the power source switch 2 turns on (i.e., under an operation condition), the BU power source 8 is coupled with the SD card 7. The power source 4 includes DC/DC converters 4a-4c therein. The converters 4a-4c generate 3.3 volts, 1.1 volts and 1.8 volts according to a control signal from the reset sequencer 3, and outputs 3.3 volts, 1.1 volts and 1.8 volts to the CPU 5, respectively. The reset sequencer 3 includes a timer 3a and a back-up flag 3b (i.e., a "BU flag") therein. The BU flag 3b turns off under a condition that the reset sequencer 3 is activated. The reset sequencer 3 receives an accessory-on signal (i.e., a level signal, which becomes a high level, for example, under a condition that the ignition switch is located at an accessory position) as an activation signal from the ignition switch of the vehicle, as described later. The reset sequencer 3 controls the power source switch 2 and the power source 4 according to reception of the signal, as described later.

The SD card 7 includes a controller 7a, a RAM 7b and a NAND type flash memory 7c therein. The controller 7a manages the control of a failure block in the NAND type flash memory 7c and the relation between a logic block and a physical block based on a convert table generated by the RAM 7b.

Specifically, the NAND type flash memory 7c is divided into multiple memory blocks. A memory block is a minimum unit in case of erasing. The blocks in the NAND type flash memory 7c includes an initial failure block, which is a failure in a manufacturing process, and an acquired failure block, which is a failure during operation. The controller 7a controls the blocks not to use the failure blocks. Further, the data control of the NAND type flash memory 7c is an additive writing system so that an update data is written in a deleted region when the data is updated, and a region in which an original data exists is deleted. Thus, the physical block, in which the data corresponding to a certain logic block exists, is not fixed but always movable in the memory. Accordingly, the controller 7a searches a logic block address information storing region in all of the physical blocks when the power source turns on, and the controller 7a controls the RAM 7b to form the convert table of the logic block and the physical block. After the convert table is formed, it is possible to decide the physical block corresponding to the logic block immediately by referring the convert table. Thus, the search operation of all blocks is performed once when the power source turns on. After that, the controller 7a updates a logic address and a physical address in the convert table when the data is updated, and a position of the corresponding physical block is changed, so that the controller 7a prepares a next access.

A data line, an address line and a command line couples between the SD card 7 and the CPU 5. These lines are coupled with a 3.3V line as a power source line of the CPU 5 via a pull-up resister 9 based on a specification of the SD card 7. The NAND type flash memory 7c of the SD card 7 stores an IPL (i.e., Initial Program Loader corresponding to a boot program), an OS (Operating System corresponding to "a program to be read according to execution of the boot program"), an application program, a map data and the like. The IPL is a minimum program necessary for the CPU to read the OS.

The DRAM 6 stores data according to the CPU 5. The DRAM 6 is energized from the DC/DC converter 10, which is coupled with the BU power source 8, via the power source switch 11. The DRAM 6 maintains a memorizing state of the data. However, as described later, when anomaly occurs, the DRAM 6 is reset by the reset sequencer 3.

In view of special properties of the SD card 7 described above, it takes much time to execute an initial setting process by the controller 7a when the power source turns on, and the CPU 5 cannot access the SD card 7 during the initial setting process. This process time depends on a maker and a specification of the SD card 7. The present inventor confirms that it is necessary to assume the process time to be one second at a maximum. Specifically, the CPU 5 cannot access the SD card 7 for one second at a maximum when the power source of the SD card 7 turns on. Thus, the IPL cannot be read out from the SD card 7, and therefore, the device 1 cannot respond to a request input via an in-vehicle LAN.

Thus, in the present disclosure, operations of the reset sequencer 3 and the CPU 5 are shaped as follows.

Figure 2:
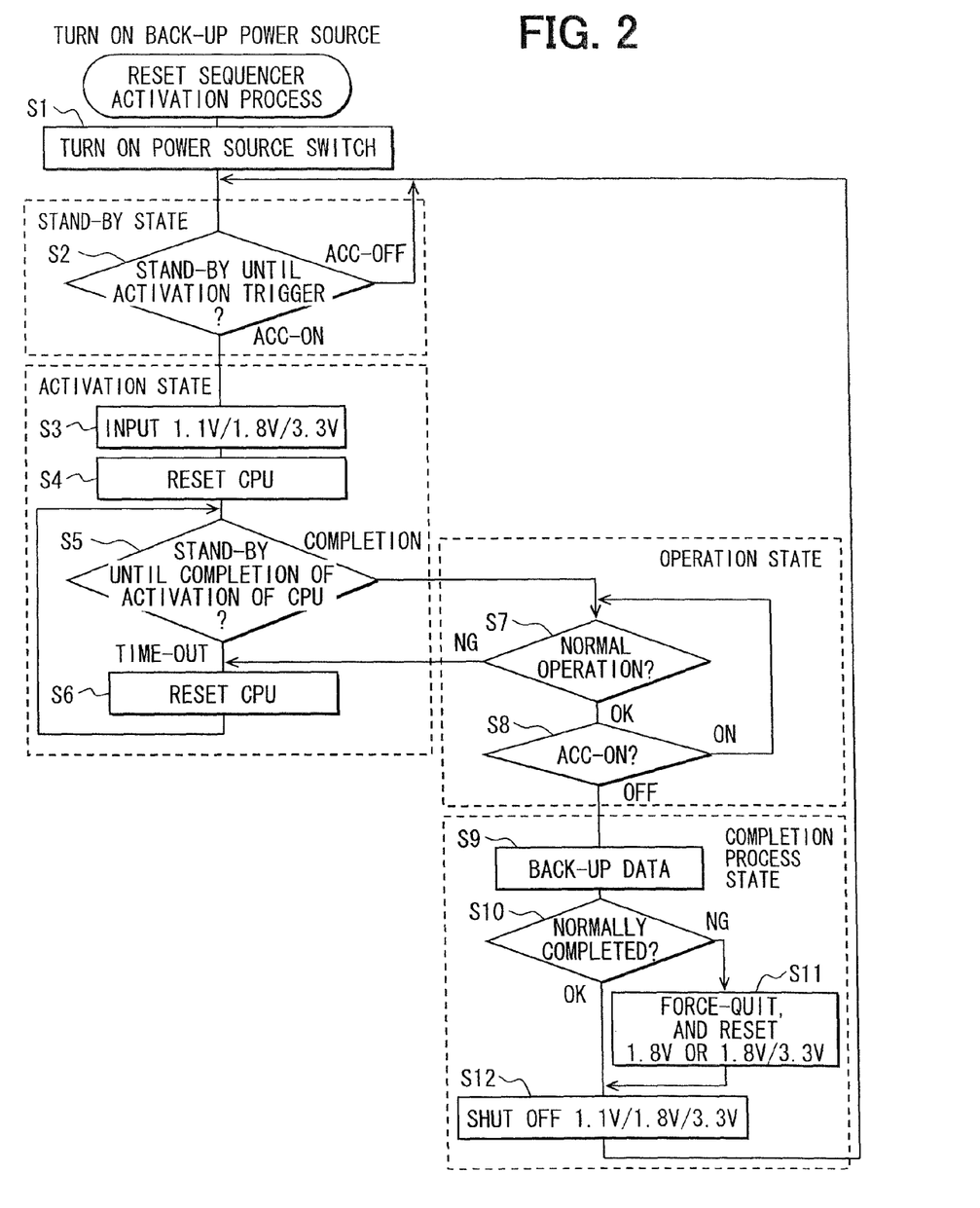
FIG. 2 is a flowchart showing an operation of a reset sequencer.

FIG. 2 is a flowchart showing operation of the reset sequencer 3. When the vehicle navigation device 1 is connected to the BU power source 8, the reset sequencer 3 is energized so that the device 1 is activated. The reset sequencer 3 turns on the power source switch 2 when the device 1 is activated (in step S1). Thus, the BU power source 8 is connected to the SD card 7 so that the SD card 7 is energized. Since the energization from the BU power source 8 continues as long as the battery is connected to the vehicle, the activation operation is performed only once at the first time when the vehicle navigation device 1 is connected to the BU power source 8. However, when the battery is charged after the battery is completely discharged, when the battery is replaced, or when the vehicle navigation device 1 is connected to the BU power source 8 again, the reset sequencer 3 is activated, and therefore, the activation is performed at the first time.

The reset sequencer 3 becomes in a stand-by state when the device 1 is activated. The sequencer 3 stands by until activation trigger is generated (in step S2). When a worker, who attaches the vehicle navigation device 1, turns the ignition switch to the accessory-on position for confirmation (which corresponds to activation operation), the accessory-on signal is received as an activation signal (the determination of step S2 is ACC-ON). The power source 4 is operated, and a voltage of 1.1V, 1.8V or 3.3V is input into the CPU (in step S3). Then, the CPU 5 is reset (in step S4).

When the CPU 5 is reset and activated, the CPU 5 executes an activation process.

Figure 4:
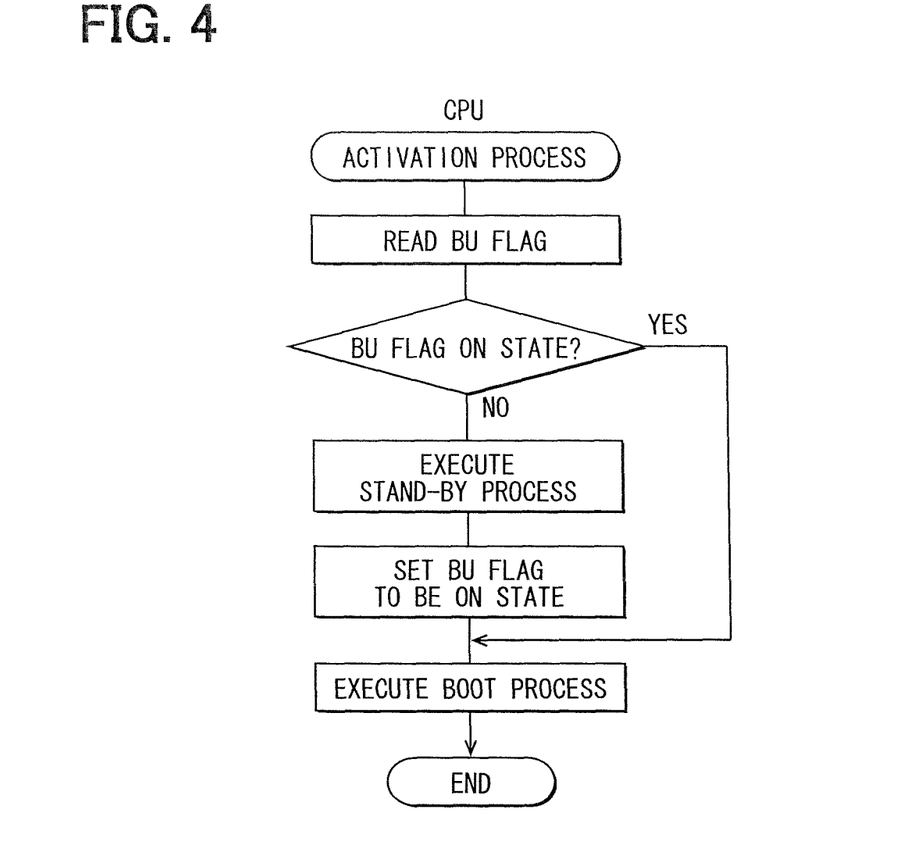
FIG. 4 is a flowchart showing an activation process in the CPU.

FIG. 4 is a flowchart showing the activation process of the CPU 5. The CPU 5 reads the BU flag 3b in the reset sequencer 3 so that the CPU 5 determines whether the BU flag 3b is an on state when the device 1 is activated. Under a condition that the reset sequencer 3 is activated, the BU flag 3b is an off state. Thus, a stand-by process is executed. The stand-by process provides to wait for sufficient time such as two seconds so that the SD card 7 executes the initial setting process. After the stand-by process ends, the BU flag is set to be the on state. Then, a boot process is executed.

Figure 5:
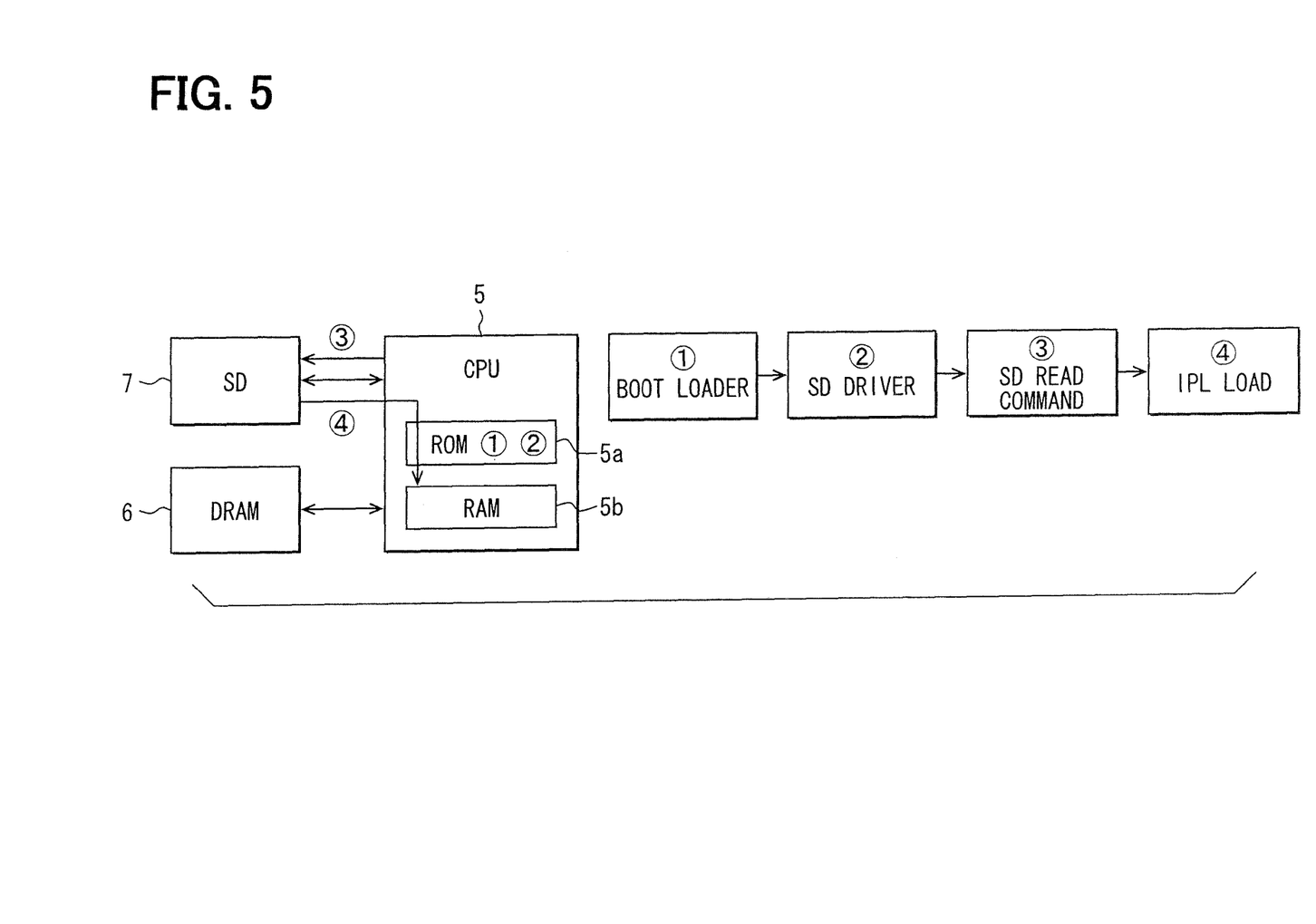
FIG. 5 is a diagram showing a procedure of a boot process in the CPU.
Figure 6A:
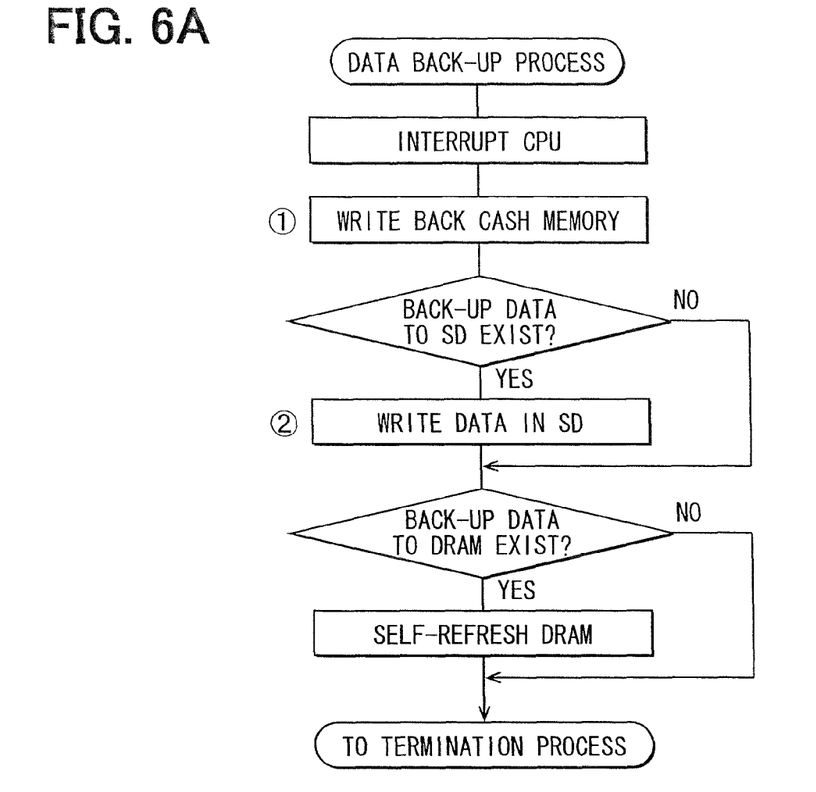
FIG. 6A is a flowchart showing a procedure of a data back-up process.
Figure 6B:
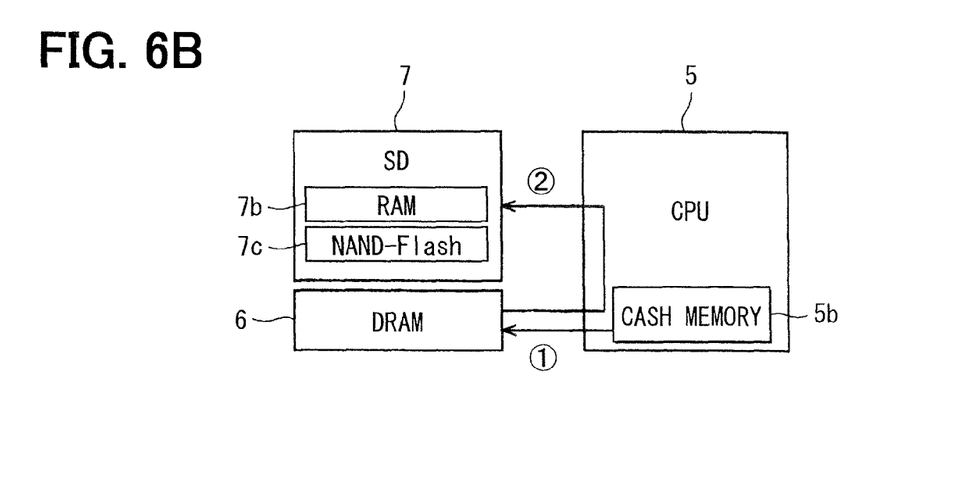
FIG. 6B is a diagram showing the procedure.

FIG. 5 shows a procedure of the boot process in the CPU 5. The ROM 5a of the CPU 5 preliminary stores a boot loader and a SD driver. First, the boot loader is read out, and then, the SD driver is activated so that the SD card 7 is accessible. After a I/F is set so that communication with the SD card 7 is performed, a read command for reading the IPL is transmitted to the SD card 7. In this case, as described above, the IPL is read out, and the OS is read out by executing the IPL since the initial setting process of the SD card 7 is completed.

Returning to FIG. 2, after the reset sequencer 3 resets the CPU 5, the sequencer 3 waits for completion of the activation of the CPU 5 (in step S5). When the sequencer 3 times out (i.e., when the determination of step S5 is TIME OUT), the sequencer 3 judges abnormal, resets the CPU 5 and activate the CPU 5 again (in step S6). When the activation of the CPU 5 is completed (i.e., when the determination of step S5 is COMPLETION), it goes to an operation state. The sequencer 3 monitors whether the CPU 5 functions normally (in step S7). Further, the sequencer 3 determines whether reception status of the accessory-on signal continues (in step S8). When the CPU 5 does not function normally (i.e., when the determination of step S7 is NG), the sequencer 3 resets the CPU 5 (in step S6).

Figure 3:
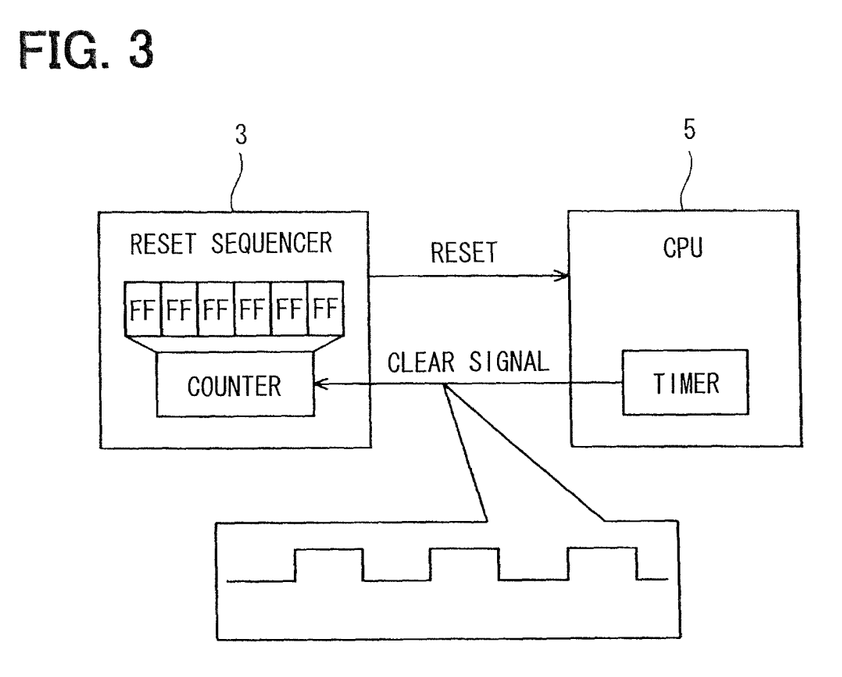
FIG. 3 is a diagram showing a reset operation of a CPU with using the reset sequencer.

FIG. 3 shows a reset operation of the CPU 5 executed by the reset sequencer 3. The CPU 5 outputs a clear signal for a watch dog to the reset sequencer 3 at predetermined time intervals, which is executed by a timer, after activation. The reset sequencer 3 executes a counting operation with using a counter. When the sequencer 3 receives the clear signal from the CPU 5 within a predetermined time, the sequencer 3 clear the counter. When the sequencer 3 does not receive the clear signal from the CPU 5 within a predetermined time, and a counter value becomes full (i.e., FFFF . . . ), the sequencer 3 judges abnormal, and resets the CPU 5. A reset operation way is not limited to this.

The reset sequencer 3 moves to a termination process state when the accessory switch turns off under an operation condition (i.e., when the determination of step S8 is OFF). When it goes to the termination process state, a process completion timer is activated, and the CPU 5 is interrupted, so that data is backed up (in step S9).

FIGS. 6A to 7B are flowcharts showing a procedures of a data back up process. There are two procedures. In the first procedure shown in FIGS. 6A and 6B, the CPU 5 writes the data, which is stored in the RAM 5b functioning as a cash memory, in the DRAM 6 when the CPU 5 is interrupted. The CPU 5 determines whether back-up data to the SD card 7 exists. When the back-up data exists, a corresponding back-up data in the DRAM 6 is transferred to the SD card 7. When data necessary to back-up to the DRAM 6 exists, the DRAM 6 is refreshed by itself. The self refresh is such that a refresh circuit mounted in the DRAM 6 refreshes the DRAM 6 automatically. When a refresh instruction is input once, data can be held only by supplying electricity to the DRAM 6. Thus, electricity consumption is restricted.

Figure 7A:
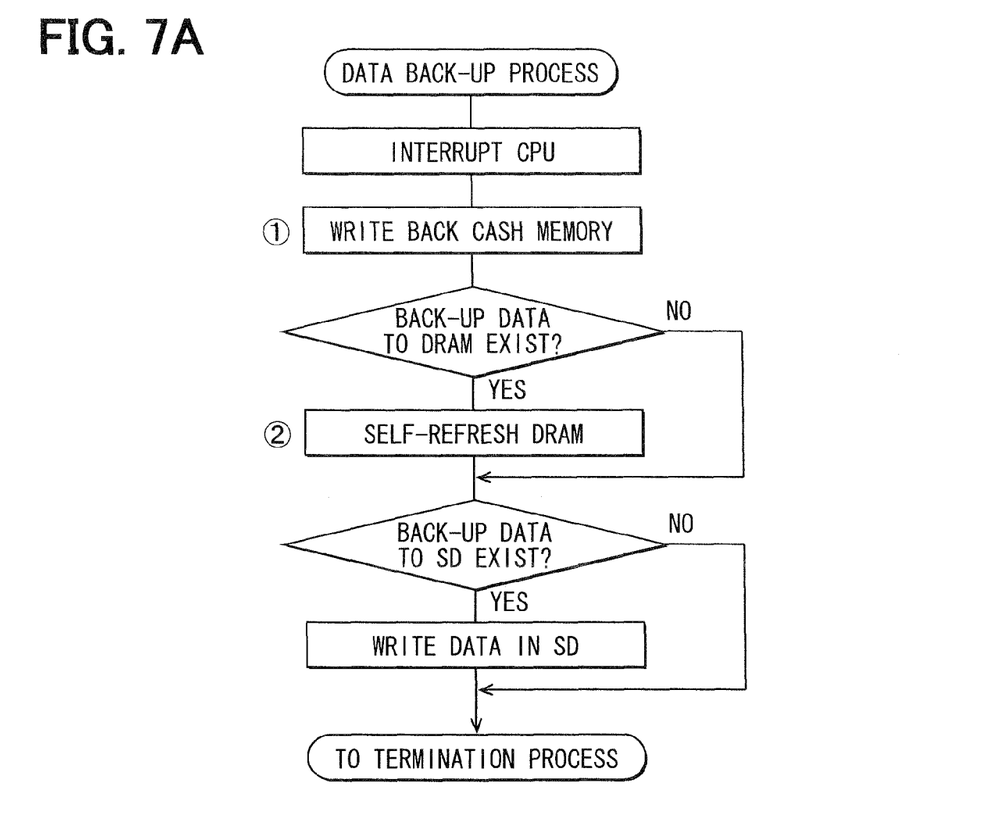
FIG. 7A is a flowchart showing the procedure of the data back-up process subsequent to FIG. 6A.
Figure 7B:
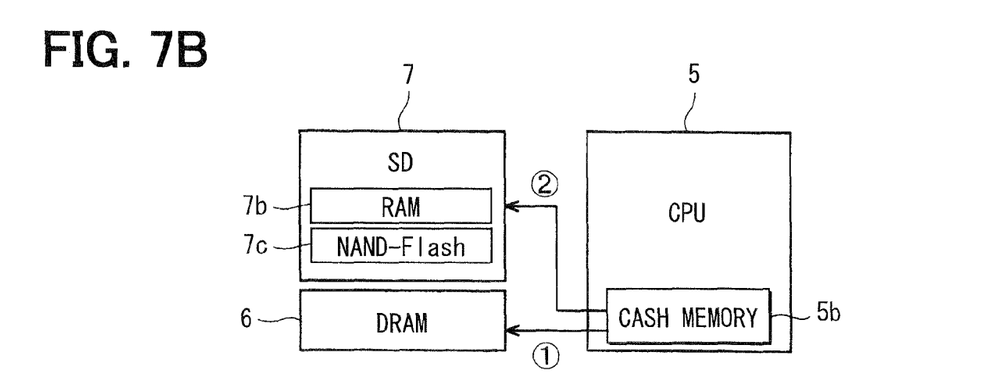
FIG. 7B is a diagram showing the procedure.

On the other hand, in the procedure shown in FIG. 7A, when the CPU 5 is interrupted, the CPU 5 writes the data of the RAM 5b in the DRAM 6. When data necessary to back-up to the DRAM 6 exists, the DRAM 6 is self-refreshed. Next, when the back-up data to the SD card 7 exists, the back-up data is written in the SD card 7.

With the above described procedures, the data stored in the RAM 5b of the CPU 5 is backed up, and the data necessary to back-up to the SD card 7 is stored.

Returning to FIG. 2, the reset sequencer 3 determines normal completion after the data is backed up in the termination process state as described above (in step S10). When normally completed within a predetermined time of the timer (i.e., when the determination of step S10 is OK), the timer is cleared, and the power source 4 is shut down, so that the CPU is shut down (in step S12). On the other hand, when time in the timer is over (i.e., when the determination of step S10 is YES), anomaly occurs, and the power source switch 2 turns off in order to force-quit. Further, the voltage of 1.8V or 3.3V in the SD card 7 or the DRAM 6, which is a memory for backing up, is reset at the same time (in step S11). Thus, since the CPU 5 and the DRAM 6 are reset, the abnormal state is recovered, and the device 1 is prepared for a next activation opportunity.

Here, it is necessary to pull up the data line, the address line and the command line as the lines between the SD card 7 and the CPU 5. However, when a pull-up resistor 9 is connected to the BU power source 8, the CPU 5 may be unstable since the voltage from the BU power source 8 reaches the CPU 5 although the CPU 5 is in a halt condition.

However, in the present embodiment, since the pull-up resistor 9 is connected to a power source line (having 3.3V) of the CPU 5, the voltage of the pull-up resistor 9 is zero volt under a condition that the energization to the CPU 5 stops. Thus, the voltage is restricted from reaching the CPU 5.

When the vehicle is delivered to a user, and the user operates to turn on the accessory, the execution of accessory-on operation is performed after the first time. In this case, since the SD card 7 continues to be energized from the BU power source 8, and the BU flag 3*b* of the reset sequencer 3 is in the on state, as shown in the activation process in FIG. 4, the CPU 5 activated by the reset sequencer 3 executes the boot process without performing the stand-by process, and the CPU 5 reads the IPL from the SD card 7 when the CPU 5 is activated. Thus, the CPU 5 reads the IPL from the SD card 7, and the CPU 5 executes the IPL so as to read the OS. The device surely responds to a request through the in-vehicle LAN.

The reset sequencer 3 resets the CPU 5 when time in the timer is up at the time of activation, as described above. When the CPU 5 is in the operation state, the sequencer 3 monitors whether the CPU 5 functions normally. When the user operates to turn off the accessory (corresponding to "cancellation of the activation operation"), the sequencer 3 backs up the data. When the CPU 5 does not shut down normally, the sequencer 3 force-quits the CPU 5, and the sequencer 3 stops energizing the DRAM at the same time.

In the present embodiment, the following effects are obtained.

The reset sequencer 3 turns on the power source switch 2 so that the SD card 7 is energized when the device 1 is activated by energization from the BU power source 8. When the sequencer 3 receives the accessory-on signal, the sequencer 3 supplies electricity to the CPU 5 so that the CPU 5 is activated. The activated CPU 5 executes the stand-by process for standing by for accessing the SD card 7 when the BU flag 3*b* of the reset sequencer 3 is in the off state, and then, the BU flag 3*b* turns on, and the boot process for reading the IPL from the SD card 7. When the BU flag 3*b* is in the on state, the CPU 5 executes the boot process without performing the stand-by process. Thus, although it takes time for the SD card 7 to performing the initial setting process when the BU power source 8 is connected, the CPU 5 reads the IPL immediately when the accessory turns on after the vehicle is delivered to the user. Further, when the IPL is executed so that the OS is read out, the device 1 can respond to an instruction from an outside, for example.

The CPU 5 determines based on the on/off state of the back-up flag stored in the reset sequencer 3, which is connected to the BU power source 8, whether the CPU 5 executes the stand-by process. Thus, even when the energization to the CPU 5 stops, the activated CPU 5 surely determines based on the on/off state of the back-up flag whether activation is performed for the first time.

The reset sequencer 3 interrupts the CPU 5 when the accessory-on signal stops so that the CPU 5 backs up the data. Accordingly, the map data stored in the RAM 5*b* of the CPU 5, which is necessary for back-up, can be stored in the SD card 7. Further, when the map data cannot be stored in the SD card 7, the power source switch 2 and the power source 4 are shut down because of anomaly. The anomaly state is recovered, and the device is reset to the initial state.

When the energization to the CPU 5 stops, each line coupling between the SD card 7 and the CPU 5 becomes zero volt through the pull-up resistor 9. Comparing with a case where the pull-up resistor 9 is connected to the back-up power source 8, the CPU 5 is restricted from being unstable when the voltage from the back-up power source 8 reaches the CPU 5 via a protection card of each line, which connects between the SD card 7 and the CPU 5.

Other Embodiments

The present invention is not limited to the above embodiment. Alternatively, the present invention may be modified or expansive as follows.

The CPU 5 may decide the first activation opportunity, and execute the initialization process when the SD card 7 does not respond to without the initial setting process at the time of activation of the power source 4. When the SD card 7 responds to at the time of activation, the CPU 5 may decide that the activation is performed after the first time, and execute the boot process without performing the initialization process. In this case, since it is not necessary to add the back-up flag in the reset sequencer 3, the construction of the reset sequencer 3 is simplified.

The above disclosure has following aspects.

According to an aspect of the present disclosure, a navigation device for a vehicle includes: a memory device including a NAND type flash memory and a controller, wherein the NAND type flash memory stores a boot program and a predetermined program, which is read out by executing the boot program, the controller searches all failure blocks in the NAND type flash memory when the memory device is energized, and the controller manages a corresponding relation between a logic block and a physical block with eliminating searched failure blocks; a back-up power source for setting down a voltage of a battery mounted on the vehicle to a predetermined voltage; a power source switch for coupling the memory device with the back-up power source in an operation state; a power source for generating another predetermined voltage with using the back-up power source in the operation state; a control device energized from the power source with the another predetermined voltage so as to be activated, wherein the control device determines whether activation is performed for the first time under a condition that the memory device is connected to the back-up power source when the control device is activated, the control device executes a stand-by process for standing by until an initial setting process of the memory device is completed when the control device determines that the activation is performed for the first time, and then, the control device executes a boot process for reading a boot program from the memory device, and the control device executes the boot process without performing the stand-by process when the control device determines that the activation is after the first time; and a power source control device. The power source control device controls the power source switch to turn on when the navigation device is coupled with the back-up power source. The power source switch transmits an activation signal for activating the control device, according to an activation operation of a user. The power source control device controls the power source to function when the power source control device receives the activation signal from the power source switch. The power source switch stops transmitting the activation signal when the user releases the activation operation. The power source control device stops the operation state of the power source when the power source switch stops the activation signal.

In the above device, when the power source control device receives the activation signal for activating the control device, the power source control device controls the power source switch to couple the memory device including the NAND type flash memory with the back-up power source. Further, the power source control device controls the power source to energize the control device. Thus, the control device is activated, and the control device determines whether activation is performed for the first time under a condition that the memory device is coupled with the back-up power source. When an operator executes an activation operation (i.e., an accessory-on operation) at a manufacturing time of the vehicle, the activation is performed for the first time. The memory device connected to the back-up power source executes the initial setting process for searching a failure block and generating a convert table between the logic block and the physical block.

After the vehicle is delivered to the user, when the activation signal is input into the power source control device according to the activation operation (i.e., the accessory-on operation) of the user, the power source control device controls the power source to energize the control device so that the control device is activated. In this case, since the activation operation is performed after the first time under a condition that the memory device is coupled with the back-up power source, the initial setting process in the memory device, which requires much time, is not executed. Thus, the control device executes the boot process for reading the boot program from the memory device. When the boot program is executed, for example, the device can respond to an instruction from an outside.

When the user releases the activation operation (i.e., an accessory-off operation), the activation signal stops. Thus, the power source control device stops energizing from the power source to the control device. In this case, the power source control device maintains the operation state of the power source switch, and therefore, the condition is maintained such that the memory device is coupled with the back-up power source.

Alternatively, the power source control device may include a back-up flag. The back-up flag is in an off state when the back-up power source is coupled with the power source control device. The control device determines that the activation is performed for the first time when the back-up flag is in the off state at an activation time of the control device. The control device controls the back-up flag to be an on state when the control device determines that the activation is performed for the first time. The control device determines that the activation is performed after the first time when the back-up flag is in the on state at the activation time of the control device. In this case, the power source control device is energized from the back-up power source. Even when energization to the control device stops, the on/off state of the back-up flag is maintained by the power source control device. Thus, the activated control device surely determines based on the on/off state of the back-up flag whether the activation is performed for the first time.

Alternatively, the control device may determine that the activation is performed for the first time when the memory device is not accessible at an activation time of the control device. The control device determines that the activation is performed after the first time when the memory device is accessible at the activation time of the control device. In this case, without adding the back-up flag in the power source control device, a software process is executed. Thus, a construction of the power source control device is simplified.

Alternatively, the power source control device may instruct the control device to execute a termination process when the power source switch stops the activation signal. The control device executes a back-up process for storing data, which is stored in the control device and necessary to back-up, into the memory device when the power source control device instructs the control device to execute the termination process. The power source control device stops the power source when the control device completes the back-up process normally within a predetermined time. The power source control device determines that abnormally occurs, and stops the power source switch and the power source when the control device does not complete the back-up process normally within a predetermined time. In this case, when the user releases the activation operation, the memory device can store the data, which is stored in the control device and necessary to back-up. Further, when the memory device cannot store the data, the device determines that abnormally occurs, and stops the power source switch and the power source. Thus, the abnormal state is eliminated, and the device resets to the initial state.

Alternatively, the navigation device for the vehicle may further include: a back-up memory device energized by the back-up power source and storing back-up data. The control device stores the data necessary to back-up into the back-up memory device in the termination process when the power source control device instructs the control device to execute the termination process. The power source control device determines that abnormally occurs, and stops energizing from the back-up power source to the back-up memory device when the control device does not complete the back-up process normally within the predetermined time. In this case, the data is stored in the back-up memory device, and the back-up memory device is reset to the initial state when anomaly occurs.

Alternatively, a line coupling between the memory device and the control device may include a line, which is required to pull up based on a specification of the memory device. The line required to pull up is coupled with a power source line, which provides to energize from the power source to the control device, via a pull-up resistor. In this case, under a condition that the control device is shut off from the power source, a predetermined line coupling between the memory device and the control device becomes zero volt through the pull-up resistor. Thus, comparing with a case where the pull-up resistor is connected to the back-up power source, the control device is restricted from being unstable because the voltage reaches the control device.

Alternatively, the activation operation may be an accessory-on operation executed by the user.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A navigation device for a vehicle comprising:
   a memory device including a NAND type flash memory and a controller, wherein the NAND type flash memory stores a boot program and a predetermined program, which is read out by executing the boot program, the controller searches all failure blocks in the NAND type flash memory when the memory device is energized, and the controller manages a corresponding relation between a logic block and a physical block with eliminating searched failure blocks;
   a back-up power source for setting down a voltage of a battery mounted on the vehicle to a predetermined voltage;
   a power source switch for coupling the memory device with the back-up power source in an operation state;
   a power source for generating another predetermined voltage with using the back-up power source in the operation state;

a control device energized from the power source with the another predetermined voltage so as to be activated, wherein the control device determines whether activation is performed for the first time under a condition that the memory device is connected to the back-up power source when the control device is activated, the control device executes a stand-by process for standing by until an initial setting process of the memory device is completed when the control device determines that the activation is performed for the first time, and then, the control device executes a boot process for reading a boot program from the memory device, and the control device executes the boot process without performing the stand-by process when the control device determines that the activation is after the first time; and a power source control device, wherein the power source control device controls the power source switch to turn on when the navigation device is coupled with the back-up power source, wherein the power source switch transmits an activation signal for activating the control device, according to an activation operation of an user, wherein the power source control device controls the power source to function when the power source control device receives the activation signal from the power source switch, wherein the power source switch stops transmitting the activation signal when the user releases the activation operation, and wherein the power source control device stops the operation state of the power source when the power source switch stops the activation signal.

2. The navigation device for the vehicle according to claim 1, wherein the power source control device includes a back-up flag, wherein the back-up flag is in an off state when the back-up power source is coupled with the power source control device, wherein the control device determines that the activation is performed for the first time when the back-up flag is in the off state at an activation time of the control device, wherein the control device controls the back-up flag to be an on state when the control device determines that the activation is performed for the first time, and wherein the control device determines that the activation is performed after the first time when the back-up flag is in the on state at the activation time of the control device.

3. The navigation device for the vehicle according to claim 1, wherein the control device determines that the activation is performed for the first time when the memory device is not accessible at an activation time of the control device, and wherein the control device determines that the activation is performed after the first time when the memory device is accessible at the activation time of the control device.

4. The navigation device for the vehicle according to claim 1, wherein the power source control device instructs the control device to execute a termination process when the power source switch stops the activation signal, wherein the control device executes a back-up process for storing data, which is stored in the control device and necessary to back-up, into the memory device when the power source control device instructs the control device to execute the termination process, wherein the power source control device stops the power source when the control device completes the back-up process normally within a predetermined time, and wherein the power source control device determines that abnormally occurs, and stops the power source switch and the power source when the control device does not complete the back-up process normally within a predetermined time.

5. The navigation device for the vehicle according to claim 4, further comprising:

a back-up memory device energized by the back-up power source and storing back-up data, wherein the control device stores the data necessary to back-up into the back-up memory device in the termination process when the power source control device instructs the control device to execute the termination process, and wherein the power source control device determines that abnormally occurs, and stops energizing from the back-up power source to the back-up memory device when the control device does not complete the back-up process normally within the predetermined time.

6. The navigation device for the vehicle according to claim 1, wherein a line coupling between the memory device and the control device includes a line, which is required to pull up based on a specification of the memory device, and wherein the line required to pull up is coupled with a power source line, which provides to energize from the power source to the control device, via a pull-up resistor.

7. The navigation device for the vehicle according to claim 1, wherein the activation operation is an accessory-on operation executed by the user.

* * * * *